United States Patent
Chytil et al.

(10) Patent No.: US 9,046,369 B2
(45) Date of Patent: Jun. 2, 2015

(54) METHODS AND SYSTEMS FOR UPDATING A MAP IN RESPONSE TO SELECTION OF CONTENT FOR DISPLAY ON THE MAP

(75) Inventors: Michael Chytil, Brno (CZ); Pavel Kolcarek, Brno (CZ); Blake Wilson, Peoria, AZ (US); Roger W. Burgin, Scottsdale, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 1038 days.

(21) Appl. No.: 12/432,578

(22) Filed: Apr. 29, 2009

(65) Prior Publication Data

US 2010/0280753 A1 Nov. 4, 2010

(51) Int. Cl.
- G01C 23/00 (2006.01)
- G01C 21/32 (2006.01)
- G01C 21/34 (2006.01)

(52) U.S. Cl.
CPC ............... G01C 23/00 (2013.01); G01C 21/32 (2013.01); G01C 21/3407 (2013.01)

(58) Field of Classification Search
CPC ..... G01C 23/00; G01C 21/3407; G01C 21/32
USPC .......... 701/200–226, 412, 454, 455; 340/990, 340/995.14–995.17
See application file for complete search history.

(56) References Cited

U.S. PATENT DOCUMENTS

| | | | |
|---|---|---|---|
| 5,041,982 A | 8/1991 | Rathnam | |
| 5,057,835 A | 10/1991 | Factor et al. | |
| 5,995,901 A | 11/1999 | Owen et al. | |
| 6,112,141 A * | 8/2000 | Briffe et al. | 701/14 |
| 6,144,920 A * | 11/2000 | Mikame | 701/212 |
| 6,199,015 B1 * | 3/2001 | Curtwright et al. | 701/455 |
| 6,314,370 B1 | 11/2001 | Curtright | |
| 6,389,355 B1 | 5/2002 | Gibbs et al. | |
| 6,799,095 B1 | 9/2004 | Owen et al. | |
| 7,230,632 B2 | 6/2007 | Coldefy et al. | |

(Continued)

FOREIGN PATENT DOCUMENTS

GB 2249417 A 5/1992

OTHER PUBLICATIONS

Tannen, R. S. (1999). Multimodal displays for target localization in a flight task (Order No. 9961806). Available from ProQuest Dissertations & Theses Full Text: Science & Technology. (304499003). Retrieved from http://search.proquest.com/docview/304499003?accountid=14753.*

(Continued)

*Primary Examiner* — Mark Holcomb
(74) *Attorney, Agent, or Firm* — Ingrassia Fisher & Lorenz, P.C.

(57) ABSTRACT

Methods and systems are provided for presenting information on a display device associated with an aircraft. A method comprises displaying a navigational map in a viewing area on the display device with initial display settings, identifying selection of a first category of information, and identifying content associated with the first category resulting in a first set of content. The method further comprises automatically updating display settings for the navigational map in response to identifying selection of the first category, wherein the display settings are updated based on the first set of content. The method further comprises displaying the first set of content on the navigational map based on the updated display settings.

19 Claims, 7 Drawing Sheets

(56) References Cited

U.S. PATENT DOCUMENTS

| | | |
|---|---|---|
| 7,403,843 B2 | 7/2008 | Gremmert |
| 7,417,641 B1 | 8/2008 | Barber et al. |
| 7,693,621 B1* | 4/2010 | Chamas .......................... 701/16 |
| 7,876,238 B2* | 1/2011 | Vandenbergh et al. ....... 340/971 |
| 7,908,082 B2* | 3/2011 | Clark et al. ................... 701/211 |
| 7,912,592 B2* | 3/2011 | Komer et al. ..................... 701/3 |
| 2006/0005147 A1 | 1/2006 | Hammack et al. |
| 2007/0168120 A1 | 7/2007 | Vandenbergh et al. |
| 2008/0162031 A1* | 7/2008 | Okuyama et al. ............. 701/200 |
| 2008/0275645 A1* | 11/2008 | Hoshino ....................... 701/209 |
| 2010/0220113 A1 | 9/2010 | Kennedy |

OTHER PUBLICATIONS

EP Search Report, EP 10160612.7 dated Aug. 26, 2010.
EP Communication, EP10160612.7-1236 dated Apr. 28, 2011.
EP Communication, EP 10160612.7-1236 dated Jun. 15, 2012.

* cited by examiner

METHODS AND SYSTEMS FOR UPDATING A MAP IN RESPONSE TO SELECTION OF CONTENT FOR DISPLAY ON THE MAP

TECHNICAL FIELD

The subject matter described herein relates generally to avionics systems, and more particularly, embodiments of the subject matter relate to avionics systems and related cockpit displays adapted for automatically updating a navigational map in response to a user selecting content for display.

BACKGROUND

Modern flight deck displays (or cockpit displays) for vehicles (such as aircraft) display a considerable amount of information, such as vehicle position, navigation and terrain information. In the case of an aircraft, many modern displays include a lateral view, generally known as a lateral map display, which is basically a top-down view of the flight plan that may include, for example, a top-down view aircraft symbol, terrain information, political boundaries, navigation aids and/or waypoint symbols, line segments that interconnect the waypoint symbols, and range rings.

Often, it may be desirable to view other flight-related information in the lateral view, such as, for example, weather information, air traffic information, terminal airspace, special use airspace, instrument procedures, and the like. A user (e.g., a pilot and/or co-pilot) may select one or more of these additional categories of flight-related information for display on the lateral view. However, depending on the current display settings, the content associated with the selected categories may lie outside the currently displayed area and/or appear cropped, or in other cases, the content may be presented with a size that is unintelligible and/or indistinguishable. In this situation, in order to adequately view the displayed content, in addition to selecting the information for display, the user must also manually adjust the display settings for the lateral view in order to view the information. For example, in some aircraft, the pilot has a dedicated control element (e.g., a knob or joystick) for manually adjusting the display. This undesirably increases the workload on the pilot and/or co-pilot.

BRIEF SUMMARY

A method is provided for presenting information on a display device associated with an aircraft. A method comprises displaying a navigational map in a viewing area on the display device with initial display settings, identifying selection of a first category of information, and identifying content associated with the first category resulting in a first set of content. The method further comprises automatically updating display settings for the navigational map in response to identifying selection of the first category, wherein the display settings are updated based on the first set of content. The method further comprises displaying the first set of content on the navigational map based on the updated display settings.

In another embodiment, an apparatus is provided for a display system onboard an aircraft. The display system comprises a display device configured to display a navigational map in a viewing area with initial display settings and a user interface configured to receive user input indicative of selection of a first category of information. The display system further comprises a processing architecture coupled to the user interface and the display device. The processing architecture is configured to identify selection of the first category of information. In response to identifying selection of the first category of information, the processing architecture is configured to identify content associated with the first category of information resulting in identified content and automatically update display settings for the navigational map based on the identified content resulting in updated display settings. The processing architecture is further configured to display the navigational map on the display device based on the updated display settings and display the identified content on the navigational map.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements.

DETAILED DESCRIPTION

The following detailed description is merely exemplary in nature and is not intended to limit the subject matter of the application and uses thereof. Furthermore, there is no intention to be bound by any theory presented in the preceding background or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to display systems adapted for displaying, on a display device associated with an aircraft, a navigational map with display settings that are automatically adjusted and/or updated in response to a user selecting content for display on the navigational map. The selected content is displayed on the navigational map nearly instantaneously in response to the user selecting the content for display. The updated display settings for the navigational map are based on the selected content, such that the selected content is displayed in the navigational map with the appropriate range setting and center location. A user can quickly and intuitively view and analyze the selected content and ascertain the relative real-world positioning of the aircraft with respect to the selected content, e.g., the approach course, the airport, the terminal airspace, neighboring air traffic, weather conditions, and the like. The overall workload on the user is reduced and the selected content is presented in a manner that does not degrade situational awareness and enables a user to focus on more significant tasks, such as, for example, operating the aircraft, coordinating and/or communicating with air traffic control, and the like.

Figure 1:
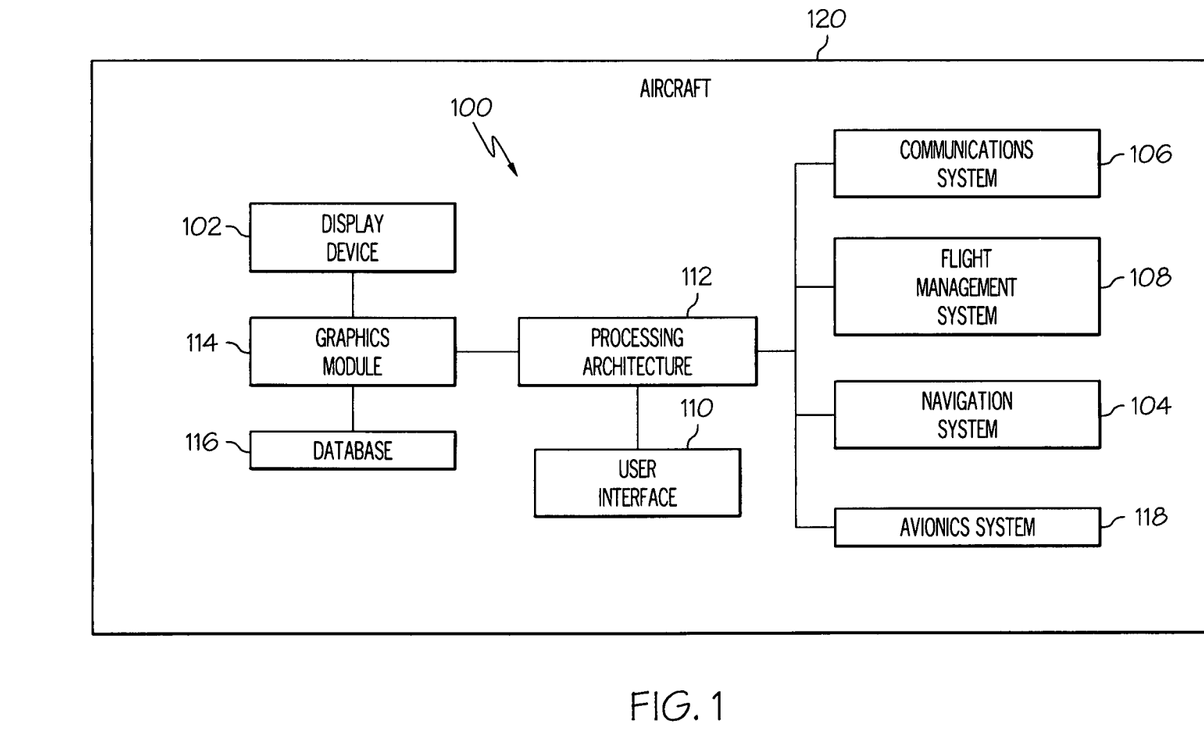
FIG. 1 is a block diagram of a display system suitable for use in an aircraft in accordance with one embodiment.

FIG. 1 depicts an exemplary embodiment of a display system 100, which may be located onboard an aircraft 120. In an exemplary embodiment, the display system 100 includes, without limitation, a display device 102, a navigation system 104, a communications system 106, a flight management system 108 (FMS), an avionics system 118, a processing architecture 112, and a graphics module 114. The display system 100 may further include a user interface 110 for enabling interactivity with the display system 100 and a database 116 suitably configured to support operation of the display system 100, as described in greater detail below. It should be understood that FIG. 1 is a simplified representation of a display system 100 for purposes of explanation and ease of description, and FIG. 1 is not intended to limit the application or scope of the subject matter in any way. In practice, the display system 100 and/or aircraft 120 will include numerous other devices and components for providing additional functions and features, as will be appreciated in the art.

In an exemplary embodiment, the display device 102 is coupled to the graphics module 114. The graphics module 114 is coupled to the processing architecture 112, and the processing architecture 112 and the graphics module 114 are cooperatively configured to display, render, or otherwise convey one or more graphical representations or images associated with operation of the aircraft 120 on the display device 102, as described in greater detail below. The processing architecture 112 is coupled to the navigation system 104 for obtaining real-time navigational data and/or information regarding operation of the aircraft 120 to support operation of the display system 100. In an exemplary embodiment, the communications system 106 is coupled to the processing architecture 112 and configured to support communications to and/or from the aircraft 120, as will be appreciated in the art and described in greater detail below. The processing architecture 112 is also coupled to the flight management system 108, which in turn, may also be coupled to the navigation system 104 and the communications system 106 for providing real-time data and/or information regarding operation of the aircraft 120 to the processing architecture 112 to support operation of the aircraft 120, as will be appreciated in the art. The avionics system 118 is coupled to the processing architecture 112, and the avionics system 118 provides flight-related information to the processing architecture 112 which may be displayed on the display device 102, as described in greater detail below. In an exemplary embodiment, the user interface 110 is coupled to the processing architecture 112, and the user interface 110 and the processing architecture 112 are cooperatively configured to allow a user to interact with the display device 102 and other elements of display system 100, as described in greater detail below.

In an exemplary embodiment, the display device 102 is realized as an electronic display configured to graphically display flight information or other data associated with operation of the aircraft 120 under control of the graphics module 114. In an exemplary embodiment, the display device 102 is located within a cockpit of the aircraft 120. It will be appreciated that although FIG. 1 shows a single display device 102, in practice, additional display devices may be present onboard the aircraft 120. In an exemplary embodiment, the user interface 110 is also located within the cockpit of the aircraft 120 and adapted to allow a user (e.g., pilot, co-pilot, or crew member) to interact with the display system 100 and enables a user to indicate, select, or otherwise manipulate content displayed on the display device 102, as described in greater detail below. In various embodiments, the user interface 110 may be realized as a keypad, touchpad, keyboard, mouse, touchscreen, joystick, microphone, or another suitable device adapted to receive input from a user. It should be appreciated that although FIG. 1 shows the display device 102 and the user interface 110 as being located within the aircraft 120, in practice, the display device 102 and/or user interface 110 may be located outside the aircraft 120 (e.g., on the ground as part of an air traffic control center or another command center) and communicatively coupled to the remaining elements of the display system 100 (e.g., via a data link).

In an exemplary embodiment, the navigation system 104 is configured to obtain one or more navigational parameters associated with operation of the aircraft 120. The navigation system 104 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 104, as will be appreciated in the art. In an exemplary embodiment, the navigation system 104 is capable of obtaining and/or determining the instantaneous position of the aircraft 120, that is, the current location of the aircraft 120 (e.g., the latitude and longitude) and the altitude or above ground level for the aircraft 120. In some embodiments, the navigation system 104 may also obtain and/or determine the heading of the aircraft 120 (i.e., the direction the aircraft is traveling in relative to some reference).

In an exemplary embodiment, the communications system 106 is suitably configured to support communications between the aircraft 120 and another aircraft or ground location (e.g., air traffic control). In this regard, the communications system 106 may be realized using a radio communication system or another suitable data link system. In an exemplary embodiment, the flight management system 108 (or, alternatively, a flight management computer) is located onboard the aircraft 120. Although FIG. 1 is a simplified representation of display system 100, in practice, the flight management system 108 may be coupled to one or more additional modules or components as necessary to support navigation, flight planning, and other aircraft control functions in a conventional manner.

In accordance with one or more embodiments, the flight management system 108 includes or otherwise accesses a database that contains procedure information for a plurality of airports. As used herein, procedure information should be understood as a set of operating parameters or instructions associated with a particular aircraft action (e.g., landing and/or approach, take off and/or departure, taxiing) that may be undertaken by the aircraft 120 at a particular airport. In this regard, an airport should be understood as referring to a location suitable for landing (or arrival) and/or takeoff (or departure) of an aircraft, such as, for example, airports, runways, landing strips, and other suitable landing and/or departure locations. In an exemplary embodiment, the flight management system 108 maintains the association of the procedure information and the corresponding airport. In an exemplary embodiment, the procedure information maintained by the flight management system 108 (e.g., in a database) comprises instrument procedure information traditionally displayed on a published chart (or approach plate) for the airport, as will be appreciated in the art. In this regard, the procedure information may comprise instrument approach procedures, standard terminal arrival routes, instrument departure procedures, standard instrument departure routes, obstacle departure procedures, or other suitable instrument procedure information. It should be appreciated that although the subject matter may described herein in the context of an instrument approach procedure for purposes of explanation, the subject matter is not intended to be limited to an approach procedure, and in practice, the subject matter may be implemented for departures and other aircraft actions in a similar manner as described below.

Each airport (or landing location) may have one or more predefined approaches associated therewith, wherein each approach may have instrument approach procedure information associated therewith. For example, an airport may comprise a plurality of possible approaches depending on the particular airport runway chosen for landing. In this regard, the flight management system 108 maintains the association of the instrument approach procedure information and the corresponding approach for each airport or landing location. In a similar manner, an airport (or departure location) may have at least one departure route having instrument departure procedure information associated therewith, as will be appreciated in the art. In an exemplary embodiment, the flight management system 108, the processing architecture 112 and the graphics module 114 are cooperatively configured to render and/or display instrument approach procedure information for an identified approach (or instrument departure procedure information for an identified departure route) on the display device 102, as described in greater detail below.

The processing architecture 112 generally represents the hardware, software, and/or firmware components configured to facilitate the display and/or rendering of instrument procedure information on the display device 102 and perform additional tasks and/or functions described in greater detail below. Depending on the embodiment, the processing architecture 112 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The processing architecture 112 may also be implemented as a combination of computing devices, e.g., a combination of a digital signal processor and a microprocessor, a plurality of microprocessors, one or more microprocessors in conjunction with a digital signal processor core, or any other such configuration. In practice, the processing architecture 112 includes processing logic that may be configured to carry out the functions, techniques, and processing tasks associated with the operation of the display system 100, as described in greater detail below. Furthermore, the steps of a method or algorithm described in connection with the embodiments disclosed herein may be embodied directly in hardware, in firmware, in a software module executed by the processing architecture 112, or in any practical combination thereof.

The graphics module 114 generally represents the hardware, software, and/or firmware components configured to control the display and/or rendering of instrument procedure information on the display device 102 and perform additional tasks and/or functions described in greater detail below. In an exemplary embodiment, the graphics module 114 accesses one or more databases 116 suitably configured to support operations of the graphics module 114, as described below. In this regard, the database 116 may comprise a terrain database, an obstacle database, a navigational database, a geopolitical database, a terminal airspace database, a special use airspace database, or other information for rendering and/or displaying content related to an instrument approach procedure on the display device 102, as described below. It will be appreciated that although FIG. 1 shows a single database 116 for purposes of explanation and ease of description, in practice, numerous databases will likely be present in a practical embodiment of the display system 100.

The avionics system 118 represents an electronic system onboard the aircraft 120 which obtains and/or provides real-time flight-related information to the processing architecture 112 for display on the display device 102. Depending on the embodiment, the avionics system 118 may be realized as a weather system, an air traffic management system, a radar system, a traffic avoidance system, or another suitable avionics system known in the art. It will be appreciated that although FIG. 1 shows a single avionics system 118 for purposes of explanation and ease of description, in practice, numerous avionics systems will likely be present onboard the aircraft 120.

Figure 2:
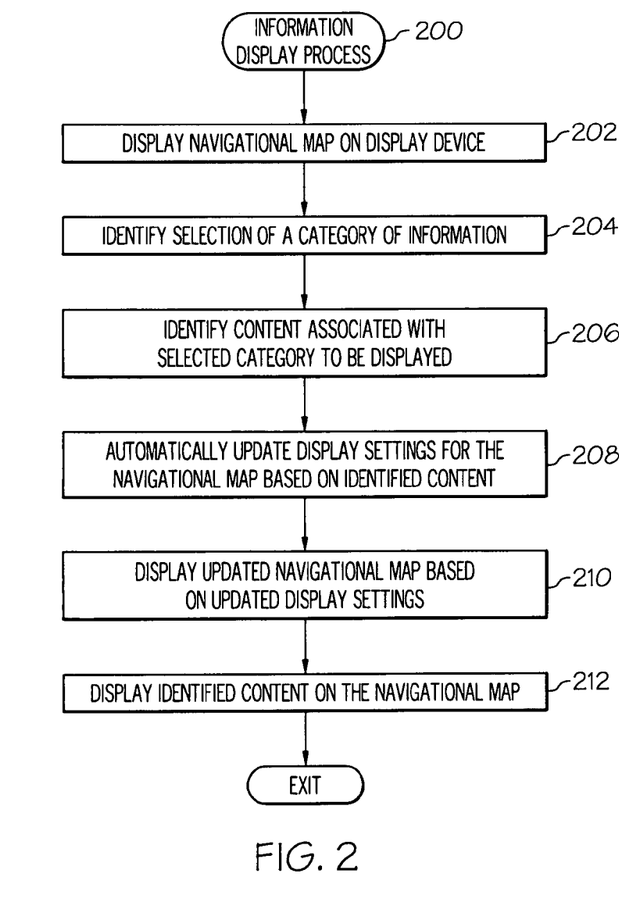
FIG. 2 is a flow diagram of an exemplary information display process suitable for use with the display system of FIG. 1 in accordance with one embodiment.

Referring now to FIG. 2, in an exemplary embodiment, a display system 100 may be configured to perform an information display process 200 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the display device 102, the navigation system 104, the communications system 106, the flight management system 108, the avionics system 118, the user interface 110, the processing architecture 112, the graphics module 114 and/or the database 116. It should be appreciated that any number of additional or alternative tasks may be included, and may be incorporated into a more comprehensive procedure or process having additional functionality not described in detail herein.

Referring again to FIG. 2, and with continued reference to FIG. 1, an information display process 200 may be performed present flight-related information (e.g., instrument procedures, weather, air traffic, airspace restrictions and/or designations) on a display device in order to enable a user, such as a pilot or crew member, to quickly and easily review and/or analyze the information without excessive user interaction and/or manipulation in configuring the display. It should be appreciated that although the information display process 200 is described in the context of particular categories or types of information (e.g., instrument approach procedures) for purposes of explanation, the information display process 200 may be implemented in conjunction with any suitable information and/or content in a similar manner as described herein.

In an exemplary embodiment, the information display process 200 initializes by displaying a navigational map relating to operation of an aircraft in a viewing area on a display device associated with the aircraft (task 202). For example, referring now to FIG. 3, and with continued reference to FIG. 1 and FIG. 2, the information display process 200 may display and/or render a navigational map 300 associated with the current (or instantaneous) location of an aircraft on a display device in the aircraft. In this regard, the graphics module 114 may be configured to control the rendering of the navigational map 300, which may be graphically displayed on the display device 102. The information display process 200 may also be configured to render a graphical representation of the aircraft 302 on the map 300, which may be overlaid or rendered on top of a background 304. In an exemplary embodiment, the background 304 comprises a graphical representation of the terrain, topology, or other suitable items or points of interest corresponding to (or within a given distance of) a location of the aircraft 120, which may be maintained in a terrain database, a navigational database, a geopolitical database, or another suitable database. In an exemplary embodiment, the map 300 is associated with the movement of the aircraft, and the background 304 refreshes or updates as the aircraft travels, such that the graphical representation of the aircraft 302 is positioned over the terrain background 304 in a manner that accurately reflects the current (e.g., instantaneous or substantially real-time) real-world positioning of the aircraft 120 relative to the earth.

Figure 3:
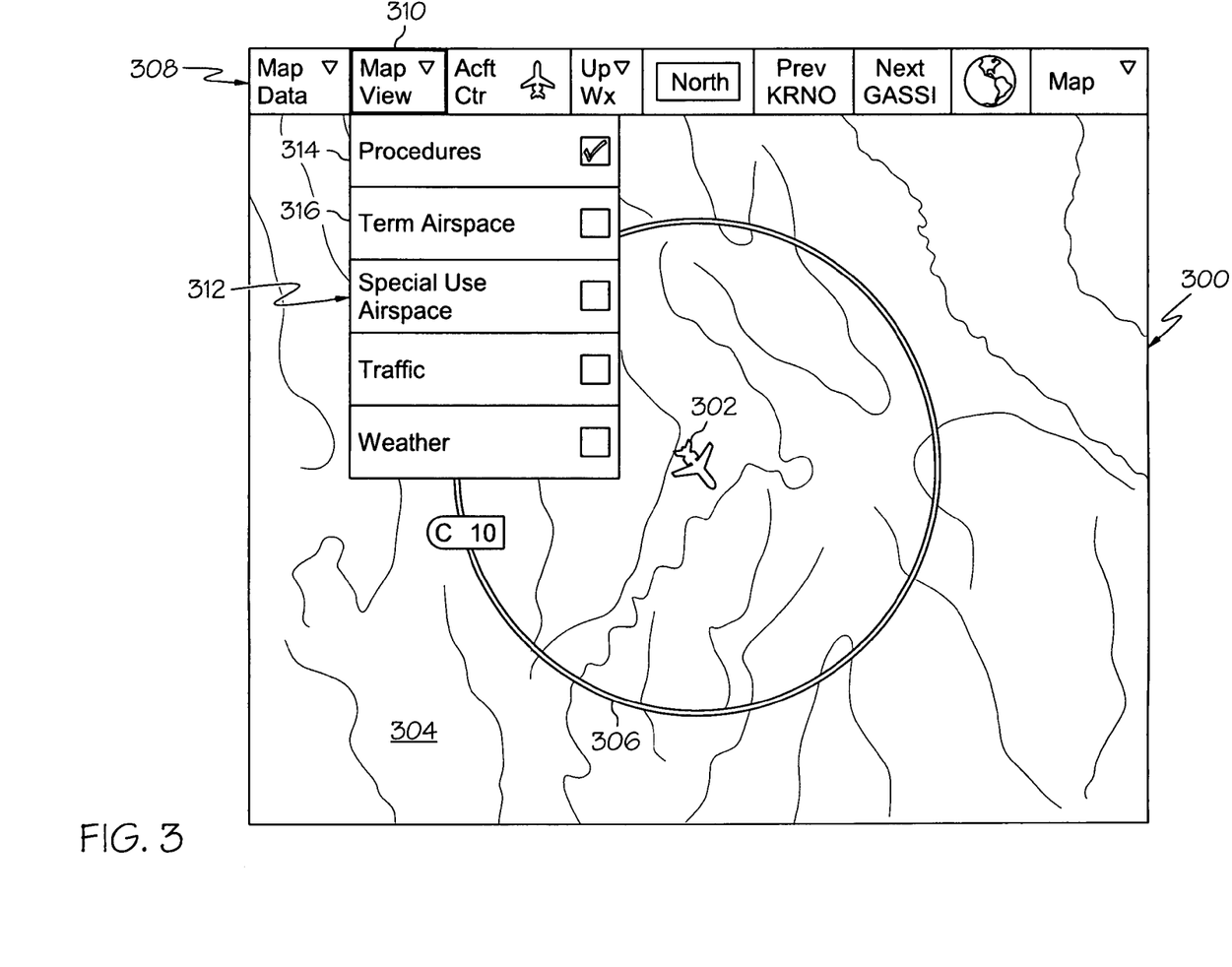
FIG. 3 is a schematic view of an exemplary navigational map suitable for use with the information display process of FIG. 2 in accordance with one embodiment.

In an exemplary embodiment, the navigational map 300 is displayed with initial display settings. The display settings comprise one or more characteristics that control the manner in which the aircraft 302 and/or terrain 304 initially appear on the display device, such as, for example, an initial aspect ratio, orientation, center location, and range setting. In this regard, "initial," "initial display settings," and words of similar import should be understood as referring to display settings for the navigational map prior to identifying selection of one or more categories of information for display, as described in greater detail below. For example, the navigational map 300 may be displayed with an initial aspect ratio that corresponds to the physical dimensions of the viewing area of the display device. Depending on the embodiment, the orientation of the navigational map 300 may be north-up (i.e., moving upward on the map 300 corresponds to traveling northward) as shown in FIG. 3, however, in alternative embodiments, the orientation of the navigational map 300 may be track-up or heading-up (i.e., aligned such that the aircraft 302 is always traveling in an upward direction and the background 304 adjusted accordingly) as will be appreciated in the art.

The center location of the navigational map 300 comprises a reference location for the middle or geometric center of the navigational map 300 which corresponds to a geographical location on the ground. The aircraft 302 and/or terrain 304 are positioned and/or rendered within the navigational map 300 with respect to the center location in a manner that accurately reflects the real-world positioning of the aircraft 302 and/or terrain 304 relative to the center location. As shown in FIG. 3, in accordance with one or more embodiments, the map 300 may be initially centered on the aircraft 302 such that the center location of the navigational map 300 corresponds to the current location of the aircraft 302. In this regard, the navigational map 300 may be updated or refreshed such that remains centered on the aircraft 302 as the aircraft travels, as will be appreciated in the art. In alternative embodiments, the navigational map 300 may be centered on some other center location.

The range setting for the navigational map 300 corresponds to the field of view for the navigational map 300, that is, the amount of geographical area (e.g., terrain 304) displayed in the navigational map 300. In this regard, the range setting for the navigational map 300 is inversely related to the scale of the navigational map 300, that is, the ratio of a single unit of distance on the map 300 to a corresponding distance on the ground. As such, a higher range setting corresponds to a lower scale (or a larger field of view) for the navigational map 300 while a lower range setting corresponds to a higher scale (or a smaller field of view) for the navigational map 300. In an exemplary embodiment, the information display process 200 indicates the range setting for the navigational map 300 by displaying and/or rendering a range ring 306 on the navigational map 300. The range ring 306 comprises a circle that is always displayed with a fixed dimension and/or size on the navigational map 300 and indicates the range setting for the navigational map 300. In accordance with one embodiment, the range setting is equal to the real-world distance that corresponds to (or is equivalent to) the radius of the range ring 306 based on the scale of the navigational map 300. As shown in FIG. 3, the range ring 306 indicates that the radius of the circle comprising the range ring 306 corresponds to a distance of ten nautical miles.

In an exemplary embodiment, the information display process 200 continues by identifying selection of one or more categories of information to be displayed on the navigational map (task 204). Each category of information corresponds to flight-related content and/or information that may be displayed on the navigational map 300. A user may utilize the user interface 110 to indicate and/or select one or more categories of information that the user would like to view in the navigational map 300 on the display device. In an exemplary embodiment, a user graphically selects and/or indicates the one or more categories of information for display by utilizing the navigational map 300. For example, in the illustrated embodiment of FIG. 3, the information display process 200 displays a menu bar 308 within the navigational map 300 having one or more selectable segments. A user manipulate the user interface 110 and indicate or select a selectable segment 310 corresponding to a plurality of possible categories of information that may be displayed on the display device. In response to the user indicating and/or selecting the selectable segment 310, the information display process 200 may display a list 312 containing a plurality of categories of information, such as, for example, instrument procedures (e.g., "Procedures"), terminal airspace (e.g., "Term Airspace"), special use airspace (e.g., "Special Use Airspace"), air traffic (e.g., "Traffic"), weather (e.g., "Weather"), and the like. A user manipulate the user interface 110 to indicate and/or select one or more categories from the list 312, for example, by positioning a cursor or pointer over the desired category and clicking or otherwise selecting each desired category (e.g., by selecting a checkbox associated with a desired category). For example, in the illustrated embodiment, the information display process 200 identifies selection of a first category 314 corresponding to instrument procedures in response to receiving user input indicative of selection of the first category 314 from the list 312. It should be noted that any number of categories of information may be identified and/or selected for display and the subject matter is not limited to the number of categories of information selected for display, as will be appreciated in the art and described in greater detail below.

In an exemplary embodiment, in response to identifying selection of a category of information for display, the information display process 200 continues by identifying content associated with the selected category to be displayed (task 206). The information display process 200 identifies and/or determines a relevant subset of the total content associated with the category for display on the navigational map. The information display process 200 identifies the relevant set of content based on one or more criteria, depending on the selected category. For example, for some categories of information, the information display process 200 may identify and/or determine the relevant subset of content based on the current status and/or current location of the aircraft. For example, if the selected category of information corresponds to air traffic, the information display process 200 may identify and/or determine that only traffic within a threshold distance (e.g., within five nautical miles) of the current location of the aircraft should be displayed. In this regard, identified set of content comprises content associated with the selected category that is within the threshold distance of the aircraft. In a similar manner, if the selected category of information corresponds to weather and/or special use airspace, the information display process 200 may identify and/or determine that only weather and/or special use airspaces within a threshold distance of the current location of the aircraft should be displayed. If the selected category of information corresponds to the terminal airspace, the information display process 200 may identify and/or determine the appropriate airport (e.g., based on the flight plan or the nearest airport) and identify and/or determine the portion of the terminal airspace to be displayed based on the current location of the aircraft. For example, because the airspace between the current location of the aircraft and the identified airport is most relevant, the information display process 200 may identify the terminal airspace content to be displayed as the portion of the terminal airspace which is on the same side of the airport as the aircraft.

If the category selected pertains to instrument procedures, the information display process 200 may determine the type of instrument procedure (e.g., departure procedure, approach procedure, terminal procedure) to be displayed based on the current status of the aircraft. For example, if the aircraft is currently midair and near the end of the flight plan, the information display process 200 may identify the instrument approach procedure as the type of content to be displayed. The information display process 200 may identify and/or determine the appropriate airport as set forth above, and subsequently identify and/or determine the appropriate approach for the identified airport as the relevant subset of content associated with the instrument procedure category. For example, the appropriate approach may be the most commonly used approach, the most recently used approach, a default approach for the airport, the most appropriate approach based on the current heading and/or location of the aircraft, a predetermined approach based on the flight plan and/or user input, or another suitable approach.

Figure 4:
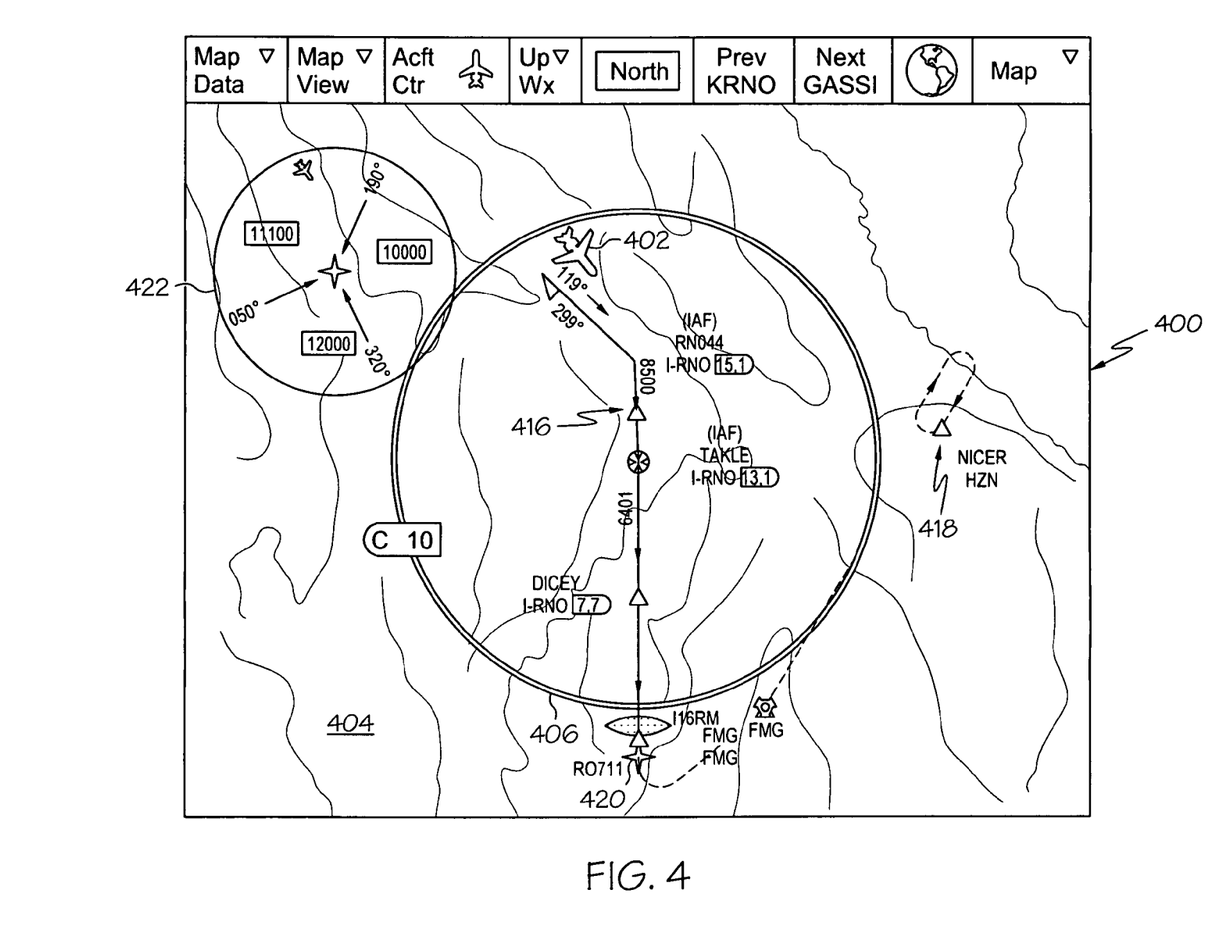
FIG. 4 is a schematic view of an exemplary navigational map suitable for use with the information display process of FIG. 2 showing the navigational map with display settings based on selected content in accordance with one embodiment.

In an exemplary embodiment, after identifying the relevant content associated with the selected category (or categories) to be displayed, the information display process 200 continues by automatically updating the display settings for the navigational map based on the identified content, displaying an updated navigational map with the updated display settings, and displaying the identified content on the updated navigational map (tasks 208, 210, 212). In an exemplary embodiment, the information display process 200 determines updated display settings (e.g., an updated range setting and/or an updated center location) based on the identified content by performing a display configuration process, as described in greater detail below in the context of FIG. 5. The identified content is displayed on the navigational map based on the updated display settings such that the identified content is adequately displayed on the navigational map. The information display process 200 automatically updates the display settings and updates navigational map with in response to identifying selection of the one or more categories of information, such that the updated navigational map is displayed instantaneously and seamlessly without any additional user interaction after selecting the one or more categories of information. For example, as shown by FIG. 4 with reference to FIG. 3, in response to identifying selection of the instrument approach procedure for airport 420, the information display process 200 determines updated display settings for the navigational map 400 based on the instrument approach procedure information such that the approach course 416, the holding pattern 418, and the airport 420 may be entirely displayed in the updated navigational map 400 without the user manually adjusting the range setting and/or center location of the navigational map. In this manner, the information display process 200 automatically updates the display settings such that the viewing area on the display device automatically transitions from the initial navigational map 300 to the updated navigational map 400 instantaneously in response to identifying selection of the first category 314 from the list 312.

Figure 5:
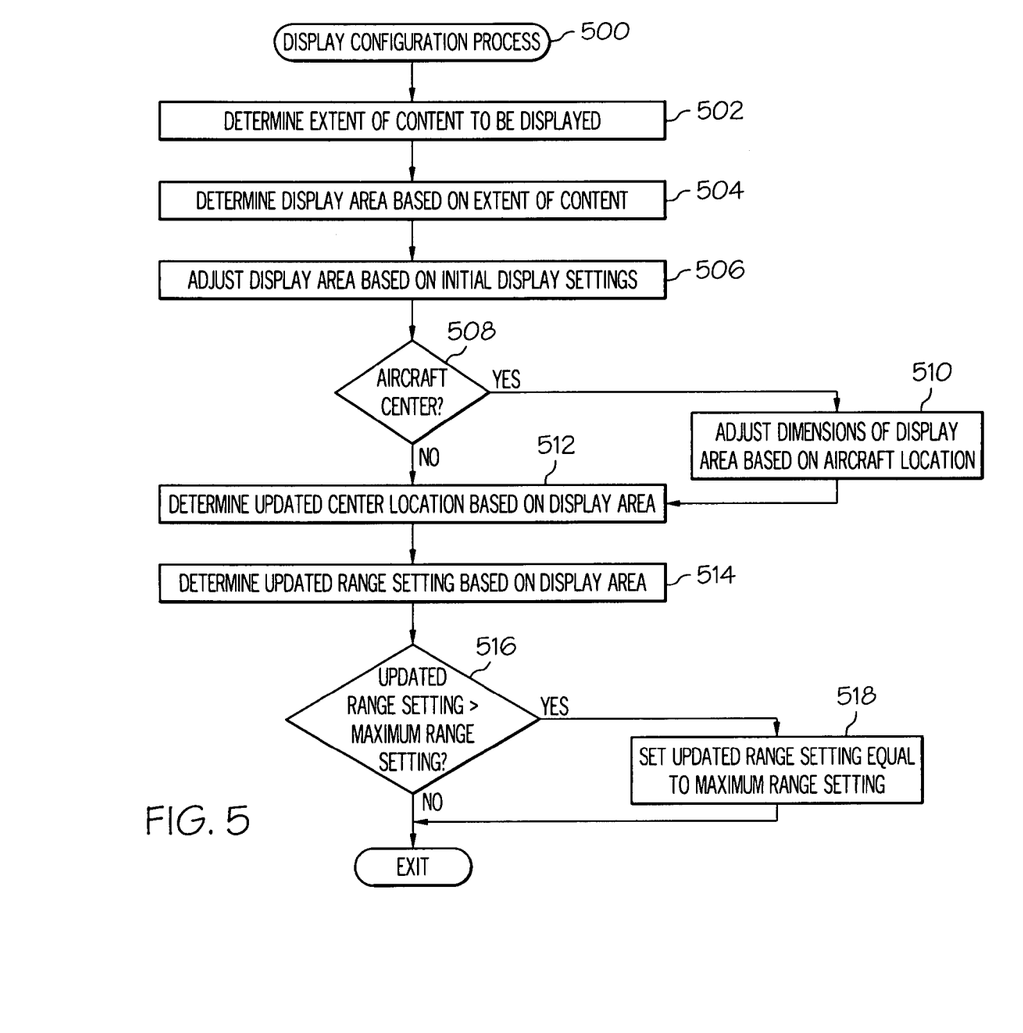
FIG. 5 is a flow diagram of an exemplary display configuration process suitable for use with the information display process of FIG. 2 in accordance with one embodiment.

Referring now to FIG. 5, in an exemplary embodiment, a display system 100 and/or information display process 200 may be configured to perform a display configuration process 500 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the display device 102, the navigation system 104, the communications system 106, the flight management system 108, the avionics system 118, the user interface 110, the processing architecture 112, the graphics module 114 and/or the database 116. It should be appreciated that any number of additional or alternative tasks may be included, and may be incorporated into a more comprehensive procedure or process having additional functionality not described in detail herein.

Referring again to FIG. 5, and with continued reference to FIGS. 1-4, a display configuration process 500 may be performed to calculate and/or determine an updated range and/or an updated center location for a navigational map based on the content to be displayed on the navigational map. The display configuration process 500 begins by determining the physical or terrestrial extent of the identified content to be displayed (task 502). In an exemplary embodiment, the display configuration process 500 determines the longitudinal and latitudinal extents for the identified content. In this regard, the longitudinal extent comprises the minimum and maximum longitudes among the longitudes corresponding to the identified content, while the latitudinal extent comprises the minimum and maximum latitudes among the latitudes corresponding to the identified content. If a plurality of categories of information have been selected, or the information display process 200 indentifies a plurality of sets of content for display, the display configuration process 500 determines the longitudinal and latitudinal extent across all of the identified content to be displayed on the navigational map. In this manner, the total area defined by the determined longitudinal and latitudinal extents encompasses or circumscribes the entirety of the identified content. For example, if content for a first category of information is within a first longitude and a second longitude and content for a second category of information is within a third longitude and a fourth longitude, the display configuration process 500 determines the longitudinal extent as the minimum and maximum longitudes of the group comprising the first longitude, the second longitude, the third longitude, and the fourth longitude. Similarly, if content for the first category is within a first latitude and a second latitude and content for the second category is within a third latitude and a fourth latitude, the display configuration process 500 determines the latitudinal extent as the minimum and maximum latitudes of the group comprising the first latitude, the second latitude, the third latitude, and the fourth latitude. In accordance with one or more embodiments, the display configuration process 500 determines the latitudinal and longitudinal extents in a manner that ensures that the current location of the aircraft is within the corresponding real-world region defined by the latitudinal and longitudinal extents.

In an exemplary embodiment, the display configuration process 500 continues by determining a display area having dimensions based on the longitudinal and latitudinal extent of the identified content (task 504). In this manner, the display area is based on the physical extent of the identified content, such that the display area circumscribes and/or encompasses the identified content. For example, in accordance with one embodiment, for a two-dimensional navigational map display, the display area corresponds to a rectangle having horizontal dimensions corresponding to the distance between longitudinal extents of the identified content and vertical dimensions corresponding to the distance between latitudinal extents of the identified content. In other embodiments, the display area may be realized with an elliptical shape or another suitable geometric shape. In some embodiments, the display configuration process 500 may adjust the display area to provide a border region and/or buffer around the perimeter of the display area, such that the identified content does not abut the edges of the navigational map when displayed or to accommodate other information and/or graphics that will be displayed in the navigational map.

In an exemplary embodiment, the display configuration process 500 continues by adjusting the display area based on the initial display settings for the navigational map (task 506). In this regard, if the navigational map is initially configured having a track-up orientation, the display configuration process 500 adjusts and/or rotates the display area such that the orientation and/or alignment of the display area accurately reflects the current heading of the aircraft. For example, if the display area comprises a rectangle with horizontal dimensions corresponding to longitude and vertical dimensions corresponding to latitude, the display area may be rotated based on the aircraft heading relative to true north. For example, if the aircraft heading (or bearing) is forty-five degrees (e.g., northeast), the display area may be rotated by forty-five degrees in the clockwise direction. Conversely, if the navigational map is configured for a north-up orientation, the orientation and/or alignment display area need not be adjusted for this example. In addition, the display configuration process 500 adjusts the dimensions of the display area based on the aspect ratio for the navigational map, such that the aspect ratio of the display area is equal to the initial aspect ratio for the navigational map. For example, if the aspect ratio of the display area is not equal to the initial aspect ratio for the navigational map, the display configuration process 500 increases and/or adjusts the constraining dimensions of the display area such that the aspect ratio of the display area is equal to the initial aspect ratio.

In an exemplary embodiment, the display configuration process 500 continues by determining whether the navigational map should be centered on the aircraft (task 508). In this regard, the navigational map may be configured to maintain centering on the aircraft or the user may select or indicate that the navigational map should be centered on the aircraft. In response to determining that the navigational map should be centered on the aircraft, the display configuration process 500 adjusts the dimensions of the display area based on the current location of the aircraft (task 510). The display configuration process 500 increases the constraining dimension(s) of the display area such that the center location of the display area (e.g., the geometric center of the shape defined by the display area) corresponds to the current location of the aircraft. For example, if the display area comprises a rectangle, the display configuration process 500 increases the horizontal dimension and/or vertical dimension of the display area such that the midpoint of the horizontal dimension is equal to the current longitude of the aircraft and the midpoint of the vertical dimension is equal to the current latitude of the aircraft.

The display configuration process 500 continues by determining the updated display settings for the navigational map based on the display area. In an exemplary embodiment, the display configuration process 500 determines and/or identifies an updated center location for the navigational map based on the display area by determining and/or identifying the geographical location corresponding to the geometric center and/or middle of the display area (task 512). For example, if the display area comprises a rectangle having a horizontal dimension corresponding to longitude and a vertical dimension corresponding to latitude, the updated center location comprises the longitude corresponding to the midpoint of the horizontal dimension and the latitude corresponding to the midpoint of the vertical dimension. If the rectangular display area is defined by a latitude minimum, a latitude maximum, a longitude minimum, and a longitude maximum, the updated center location comprises the midpoint of the latitude minimum and latitude maximum and the midpoint of the longitude minimum and longitude maximum. It should be noted that in the case where the display area has been adjusted for centering on the aircraft (tasks 508, 510), the updated center location will be equal to the current location of the aircraft.

In an exemplary embodiment, the display configuration process 500 continues by determining an updated range setting for the navigational map based on the display area (task 514). In this regard, the updated range setting corresponds to the range setting that would result if the entire region corresponding to the display area were displayed and/or rendered on the display device. For example, the display configuration process 500 may determine an updated scale (e.g., a ratio of a unit of distance on the navigational map to a corresponding real-world distance) necessary to display and/or render a graphical representation of the real-world terrain corresponding to the display area in the viewing area on the display device. The updated range setting may then be calculated and/or determined based on the updated scale and the fixed on-screen dimension for the range ring. In this manner, if the display area is greater than the initial display area used for the navigational map, the updated range setting will be greater than the initial range setting. In other words, the navigational map displayed with the updated range setting will appear as being zoomed-out relative to the initial navigational map. Conversely, if the display area is less than the initial display area used for the navigational map, the updated range setting will be less than the initial range setting, such that the navigational map displayed with the updated range setting will appear as being zoomed-in relative to the initial navigational map.

In an exemplary embodiment, after determining the updated range setting for the navigational map, the display configuration process 500 compares the updated range setting to a threshold range setting (task 516). The threshold range corresponds to a predetermined maximum range setting for the navigational map which ensures that text associated with the content and/or information to be displayed on the navigational map will be rendered with a size and/or placement that is distinguishable and legible to the user. In accordance with one or more embodiments, if the display configuration process 500 determines that the updated range setting is greater than the maximum range setting, the display configuration process 500 sets the updated range setting as being equal to the maximum range setting (task 518). It should be noted that in such an embodiment, this may result in some of the identified content being clipped or otherwise outside the view of the updated navigational map. However, the maximum range setting is preferably chosen ensure that the portion of the content and/or information displayed on the navigational map can be intelligibly analyzed and/or interpreted.

Referring to FIG. 4, with continued reference to FIGS. 1-3 and FIG. 5, in an exemplary embodiment, the information display process 200 and the display configuration process 500 are utilized to update the viewing area on the display device from the presenting first navigational map 300 to the updated navigational map 400. As shown, the information display process 200 may identify selection of the information category 314 pertaining to instrument procedures, and identify the instrument approach procedure for the airport 420 as the subset of the instrument procedure content to be displayed (tasks 204, 206). After identifying instrument approach procedure, the information display process 200 and/or display configuration process 500 determines the updated display settings for the navigational map 400 by determining the latitudinal and longitudinal extents of the instrument approach procedure, resulting in a display area that circumscribes the approach course 416, the holding pattern 418, the airport 420, and the relevant navigational reference points (tasks 208, 502, 504). As shown, the updated display area may be adjusted to provide a buffer and/or border region between the instrument approach procedure content and the edges of the navigational map 400 (e.g., between airport 420 the border of the map 400). The display area may also be adjusted to accommodate additional graphics that may be displayed proximate the border of the navigational map 400, such as, for example, a graphical representation of minimum sector altitudes 422 or other display elements. The display area is adjusted for the same aspect ratio as the initially displayed navigational map 300 (task 506).

As shown in FIG. 4, when the navigational map 400 is not configured to maintain centering on the aircraft 402, and the display configuration process 500 determines an updated center location based on the display area (tasks 508, 512). The display configuration process 500 determines an updated range setting for the navigational map 400 based on the display area which is indicated by the range ring 406 (task 514). In the illustrated embodiment, the updated range setting is equal to the initial range setting of the navigational map 300. The information display process 200 continues by automatically updating the navigational map 400 based on the updated display settings by displaying and/or rendering a graphical representation of terrain 404 corresponding to the updated center location and updated range setting (task 210). The information display process 200 displays the identified content, that is, the instrument approach procedure information (e.g., the approach course 416, holding pattern 418, and airport 420), in the updated navigational map 400 (task 212). The identified content is positioned with respect to updated center location such that the identified content is displayed overlying the terrain 404 in a manner that accurately reflects the real-world positioning of the instrument approach procedure information with respect to the ground.

Figure 6:
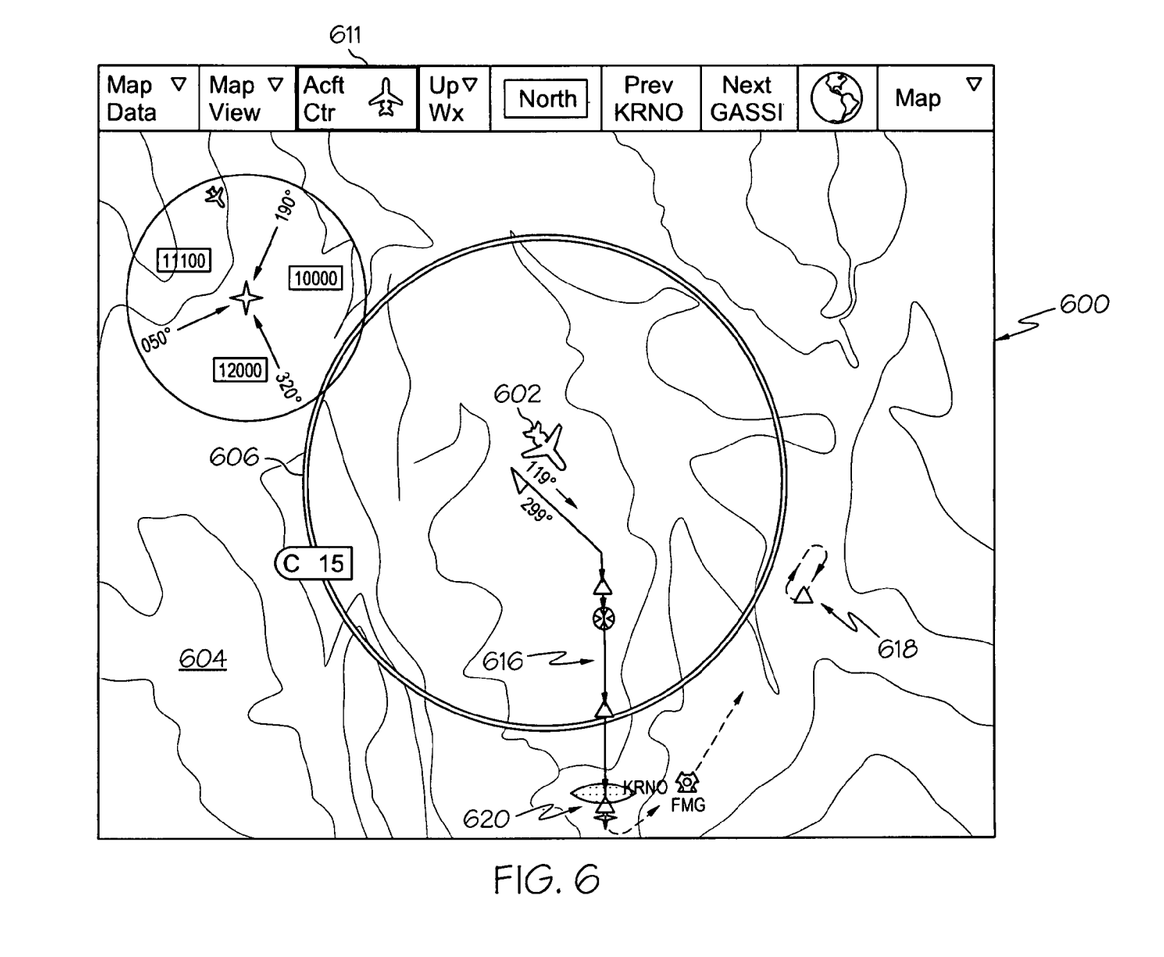
FIG. 6 is a schematic view of an exemplary navigational map suitable for use with the information display process of FIG. 2 showing the navigational map centered on the current location of the aircraft with display settings based on selected content in accordance with one embodiment.

FIG. 6 depicts an embodiment of an updated navigational map 600 which is configured to maintain centering on the aircraft 602. In this embodiment, the display configuration process 500 identifies selection of the aircraft center segment 611, and in response adjusts the dimensions of the display area such that the current location of the aircraft 602 corresponds to the geometric center of the display area (tasks 508, 510). The display configuration process 500 determines an updated center location based on the display area is equal to the current location of the aircraft 602 (task 512). The display configuration process 500 determines an updated range setting for the navigational map 600 based on the display area which is indicated by the range ring 606. In the illustrated embodiment, the updated range setting is equal to fifteen nautical miles, which is greater than range setting of the initial navigational map 300. The information display process 200 continues by automatically updating the navigational map 600 based on the updated display settings by displaying and/or rendering the terrain background 604 to corresponding to the updated center location and the updated range setting (task 210). The information display process 200 displays the instrument approach procedure information (e.g., the approach course 616, holding pattern 618, and airport 620) in the updated navigational map 600 and positioned with respect to updated center location such that the instrument approach procedure information is displayed with respect to the terrain 604 in a manner that accurately reflects the geographic positioning of the instrument approach procedure information with respect to the ground (task 212).

Figure 7:
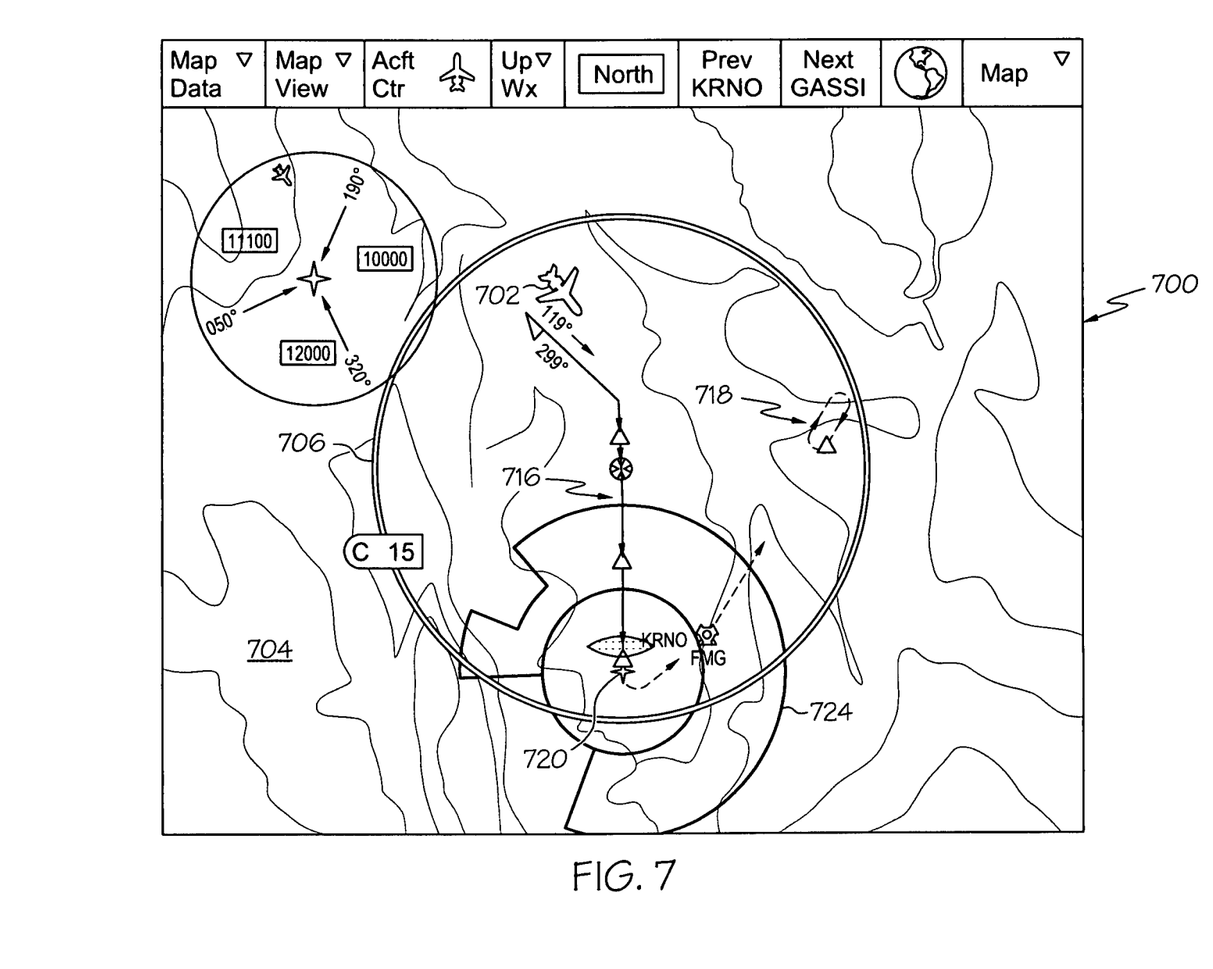
FIG. 7 is a schematic view of an exemplary navigational map suitable for use with the information display process of FIG. 2 showing the navigational map with display settings based on selected content in accordance with one embodiment.

FIG. 7 depicts an embodiment of an updated navigational map 700 in response to identifying selection of two categories of information. In this embodiment, the information display process 200 identifies selection of the information category 314 pertaining to instrument procedures and identifies selection of the information category 316 pertaining to the terminal airspace. The information display process 200 and/or display configuration process 500 determines the updated display settings for the navigational map 700 by determining the latitudinal and longitudinal extents of the instrument approach procedure for the airport 720 and the terminal airspace 724 for the airport 720, resulting in a display area that encompasses and/or circumscribes the approach course 716, the holding pattern 718, the airport 720, and the terminal airspace 724. The display configuration process 500 determines an updated center location and an updated range setting based on the display area. The information display process 200 automatically updates the navigational map 700 based on the updated display settings by displaying and/or rendering a graphical representation of terrain 704 corresponding to the updated center location and updated range setting. The information display process 200 displays the identified content, that is, the instrument approach procedure information (e.g., the approach course 716, holding pattern 718, and airport 720) and the terminal airspace 724 in the updated navigational map 700 (task 212). The identified content is positioned with respect to updated center location such that the identified content is displayed with respect to the terrain 704 and the aircraft 702 in a manner that accurately reflects the real-world positioning of the instrument approach procedure information with respect to the ground.

One advantage of the systems and/or methods described above is that the display settings are automatically adjusted and updated in response to a user selecting content for display, resulting in the relevant selected content being instantaneously displayed on the navigational map with appropriate display settings. The selected content is displayed in the navigational map with the appropriate range setting and center location, such that a user can quickly and intuitively view and analyze the selected content and ascertain the relative real-world positioning of the aircraft with respect to the selected content, e.g., the approach course, the airport, the terminal airspace, neighboring air traffic, weather conditions, and the like. The user's focus is not diverted by the need to manually adjust the display settings of the navigational map in order to view the selected content. The overall workload on the user is reduced, allowing the user to maintain situational awareness and focus on more significant tasks, such as, for example, operating the aircraft, coordinating and/or communicating with air traffic control, and the like.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A method for presenting information on a display device associated with an aircraft, the method comprising:
    obtaining, by a navigation system onboard the aircraft, a current location of the aircraft;
    displaying a navigational map in a viewing area on the display device, the navigational map having initial display settings including an initial center location, the navigational map including a graphical representation of terrain and a graphical representation of the aircraft positioned with respect to the initial center location to reflect the positioning of the terrain and the current location of the aircraft relative to the initial center location;
    displaying a menu bar within the navigational map, the menu bar having a plurality of selectable segments;
    in response to selection of a selectable segment of the plurality of selectable segments, displaying a list containing a plurality of categories of information, the plurality of categories including a category corresponding to procedures for aircraft actions that may be undertaken by the aircraft;
    identifying selection of the category from the list; and
    in response to identifying the selection of the category:
        identifying a relevant subset of content associated with the category, resulting in a first set of content comprising procedure information associated with an aircraft action that may be undertaken by the aircraft; and
        automatically updating display settings for the navigational map in response to identifying selection of the procedure information by:
            determining physical extents of the first set of content and the current location of the aircraft, a current location of the aircraft being within a region defined by the physical extents;
            determining a display area circumscribing the first set of content and the current location of the aircraft based on the physical extents;
            determining updated display settings based on the display area, wherein determining the updated display settings comprises determining an updated center location for the navigational map based on the display area, wherein the updated center location corresponds to the center of the display area and is different from the initial center location; and
            displaying the navigational map based on the updated display settings, resulting in an updated navigational map including the graphical representation of terrain and the graphical representation of the aircraft positioned with respect to the updated center location to reflect the positioning of the terrain and the current location of the aircraft relative to the updated center location; and
        displaying the first set of content on the updated navigational map based on the updated display settings.

2. The method of claim 1, wherein determining the updated display settings comprises:
    determining an updated range setting for the navigational map based on the display area; and
    when the updated range setting is greater than a threshold range setting, setting the updated range setting to the threshold range setting.

3. The method of claim 2, wherein the threshold range setting comprises a maximum range setting.

4. The method of claim 1, wherein the procedure information comprises an instrument procedure information, a standard terminal arrival route, an instrument departure procedure, a standard instrument departure route, or an obstacle departure procedure.

5. The method of claim 1, wherein the procedure information comprises a set of operating parameters or instructions for the aircraft action.

6. The method of claim 1, wherein identifying content associated with the procedure information comprises identifying a type of instrument procedure to be displayed based on a current status of the aircraft.

7. The method of claim 6, wherein identifying the type of instrument procedure comprises identifying an approach procedure if the aircraft is near an end of a flight plan for the aircraft.

8. The method of claim 1, further comprising:
identifying selection of a second category of information from the list;
identifying content associated with the second category, resulting in a second set of content, wherein:
determining the physical extents comprises determining the physical extents of the first set of content, the second set of content, and the current location of the aircraft; and
determining the display area comprises determining the display area based on physical extents to circumscribe the first set of content and the second set of content; and
displaying the second set of content on the updated navigational map.

9. The method of claim 1, the initial display settings comprising an initial aspect ratio, wherein determining the display area comprises increasing a constraining dimension of the display area to an aspect ratio equal to the initial aspect ratio.

10. The method of claim 1, wherein determining the updated display settings comprises rotating the display area based on a current heading of the aircraft, resulting in an orientation of the display area that reflects the current heading of the aircraft.

11. The method of claim 10, wherein:
the graphical representation of the aircraft is aligned to travel in an upward direction relative to the graphical representation of terrain.

12. The method of claim 1, wherein identifying the relevant subset of content comprises determining a type of instrument procedure to be displayed based on a current status of the aircraft.

13. The method of claim 12, further comprising identifying an airport based on a flight plan for the aircraft or the current location of the aircraft, wherein the relevant subset of content comprises content associated with the type of instrument procedure for the airport.

14. The method of claim 1, wherein the first set of content is positioned on the updated navigational map with respect to the updated center location and the current location of the aircraft to reflect the real-world positioning of the procedure information.

15. A method for presenting information on a display device associated with an aircraft, the method comprising:
obtaining, by a navigation system onboard the aircraft, a current location of the aircraft;
displaying a navigational map on the display device, the navigational map having an initial range setting and an initial center location, the navigational map including a graphical representation of terrain and a graphical representation of the aircraft positioned with respect to the initial center location to reflect the positioning of the terrain and the current location of the aircraft relative to the initial center location;
displaying a menu bar within the navigational map, the menu bar having a plurality of selectable segments;
in response to selection of a selectable segment of the plurality of selectable segments displaying a list containing a plurality of categories of information, the plurality of categories including a first category of flight-related information;
identifying selection of the first category of flight-related information from the list;
identifying a relevant subset of content associated with the first category of flight-related information resulting in first identified content;
determining a display area that encompasses the first identified content based on physical extents of the first identified content and the current location of the aircraft, the current location of the aircraft being within a region defined by the display area;
determining an updated range setting and an updated center location for the navigational map based on the display area, wherein the updated center location corresponds to the center of the display area and is different from the initial center location;
displaying the navigational map with the updated range setting and the updated center location, wherein the navigational map is displayed with the updated range setting and the updated center location automatically in response to identifying selection of the first category of flight-related information, and the navigational map includes the graphical representation of terrain and the graphical representation of the aircraft positioned with respect to the updated center location to reflect the positioning of the terrain and the current location of the aircraft relative to the updated center location; and
rendering the first identified content associated with the first category of flight-related information on the navigational map.

16. The method of claim 15, wherein the first category of flight-related information comprises instrument procedures, weather, air traffic, or airspace restrictions.

17. The method of claim 15, further comprising:
identifying selection of a second category of flight-related information from the list;
identifying a second relevant subset of content associated with the second category of flight-related information resulting in second identified content, wherein determining the display area comprises:
determining the display area that encompasses the first identified content and the second identified content; and
rendering the second identified content on the navigational map.

18. A display system onboard an aircraft, the display system comprising:
a navigation system to obtain a current location of the aircraft;
a display device configured to display a navigational map in a viewing area with initial display settings, the navigational map including a menu bar having a plurality of selectable segments, the navigational map having an initial center location, the navigational map including a graphical representation of terrain and a graphical representation of the aircraft positioned with respect to the initial center location to reflect the positioning of the terrain and the current location of the aircraft relative to the initial center location;
a user interface configured to receive a first user input indicative of selection of a selectable segment of the plurality of segments and a second user input indicative of selection of a first category of information; and a processing architecture coupled to the user interface and the display device, wherein the processing architecture is configured to:
- display a list containing a plurality of categories of information in response to the first user input corresponding to the selection of the selectable segment of the plurality of selectable segments, the plurality of categories including a first category for procedure information associated with an aircraft action;
- identify selection of the first category in response to the second user input; and
- in response to identifying selection of the first category:
  - identify a relevant subset of content associated with the procedure information resulting in identified content;
  - determine a display area circumscribing the identified content based on physical extents of the identified content and the current location of the aircraft;
  - automatically update display settings for the navigational map based on the display area resulting in updated display settings, the updated display settings including an updated center location determined based on the displayed area, wherein the updated center location is different from the initial center location;
  - display the navigational map based on the updated display settings, resulting in an updated navigational map including the graphical representation of terrain and the graphical representation of the aircraft positioned with respect to the updated center location to reflect the positioning of the terrain and the current location of the aircraft relative to the updated center location; and
  - display the identified content on the updated navigational map.

19. The display system of claim 18, wherein the identified content is positioned on the updated navigational map with respect to the updated center location and the current location of the aircraft to reflect the real-world positioning of the relevant subset of content associated with the procedure information.

* * * * *